United States Patent
Sjögren et al.

(10) Patent No.: US 9,019,844 B2
(45) Date of Patent: Apr. 28, 2015

(54) RADIO CARRIER IDENTIFICATION METHODS AND APPARATUS

(75) Inventors: Tommy Sjögren, Genarp (SE); Johan Hokfelt, Lund (SE); Torgny Palenius, Barsebäck (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 451 days.

(21) Appl. No.: 12/552,436

(22) Filed: Sep. 2, 2009

(65) Prior Publication Data

US 2010/0091674 A1    Apr. 15, 2010

Related U.S. Application Data

(60) Provisional application No. 61/098,982, filed on Sep. 22, 2008.

(51) Int. Cl.
*H04L 12/26* (2006.01)
*H04W 48/16* (2009.01)
*H04J 11/00* (2006.01)

(52) U.S. Cl.
CPC ............ *H04W 48/16* (2013.01); *H04J 11/0069* (2013.01)

(58) Field of Classification Search
CPC ...... H04W 48/16; H04W 48/20; H04W 48/18
USPC ........ 370/252; 455/434, 432.1, 525, 429, 422
See application file for complete search history.

(56) References Cited

U.S. PATENT DOCUMENTS

| | | | |
|---|---|---|---|
| 5,778,024 A * | 7/1998 | McDonough | 375/216 |
| 6,487,295 B1 * | 11/2002 | Lofgren et al. | 381/71.12 |
| 6,561,984 B1 * | 5/2003 | Turcott | 600/485 |
| 7,013,140 B2 | 3/2006 | Östberg et al. | |
| 7,024,191 B2 * | 4/2006 | Ofuji et al. | 455/432.1 |
| 2002/0119774 A1 | 8/2002 | Johannesson et al. | |
| 2003/0236079 A1 | 12/2003 | Hasegawa | |
| 2005/0043049 A1 * | 2/2005 | Demir et al. | 455/513 |
| 2007/0121552 A1 | 5/2007 | Lindoff | |
| 2007/0189259 A1 | 8/2007 | Sollenberger et al. | |
| 2008/0153486 A1 | 6/2008 | Ramkull et al. | |
| 2008/0220778 A1 | 9/2008 | Ekstedt et al. | |

(Continued)

FOREIGN PATENT DOCUMENTS

| | | |
|---|---|---|
| EP | 1367844 A1 | 12/2003 |
| WO | 2006/061161 A2 | 6/2006 |

(Continued)

OTHER PUBLICATIONS

EPO, International Search Report in PCT/EP2009/061731, Dec. 22, 2009.
EPO, Written Opinion in PCT/EP2009/061731, Dec. 22, 2009.

*Primary Examiner* — Jamal Javaid

(74) *Attorney, Agent, or Firm* — Patent Portfolio Builders PLLC

(57) ABSTRACT

A user equipment (UE) in a communication system measures the power received in a bandwidth on possible downlink carriers in a frequency band that is supported by the UE in order to search for available carriers. Search times can be decreased on average by using a specially configured filter to process the received power measurements and then determining likely carriers based on the filtered values. Metrics from the filter can be used to indicate both where to perform cell search and where not to perform cell search.

20 Claims, 5 Drawing Sheets

(56) References Cited

U.S. PATENT DOCUMENTS

2009/0046596 A1* 2/2009 Ewe et al. .................. 370/252
2009/0131047 A1* 5/2009 Amerga et al. ............. 455/434
2009/0137267 A1   5/2009 Nader et al.

FOREIGN PATENT DOCUMENTS

| WO | 2008/008987 A2 | 1/2008 |
| WO | 2009/068422 A1 | 6/2009 |

* cited by examiner

RADIO CARRIER IDENTIFICATION METHODS AND APPARATUS

This application claims the benefit of the filing date of U.S. Provisional Patent Application No. 61/098,982 that was filed on Sep. 22, 2008, and that is incorporated here by reference.

TECHNICAL FIELD

This invention relates to electronic communication systems and more particularly to wireless communication systems.

BACKGROUND

From time to time, a user equipment (UE), such as a mobile phone or other remote terminal in a mobile radio communication system, searches for and selects cells and public land mobile networks (PLMNs). Cell and PLMN selection has a number of objectives, which include connecting a UE to the cell(s) and PLMN(s) that will provide the highest quality of service (QoS), enable the UE to consume the least power, generate the least interference, etc.

Digital communication systems include time-division multiple access (TDMA) systems, such as cellular radio telephone systems that comply with the GSM telecommunication standard and its enhancements, such as general packet radio service (GPRS) and enhanced data rates for GSM evolution (EDGE); code-division multiple access (CDMA) systems, such as cellular radio telephone systems that comply with the IS-95, cdma2000, and wideband CDMA (WCDMA) telecommunication standards; orthogonal frequency division multiple access (OFDMA) systems, such as cellular radio telephone systems that comply with the Long Term Evolution (LTE) standard; and "blended" systems. GSM, WCDMA, LTE, etc. are different radio access technologies (RATs), and the Third Generation Partnership Project (3GPP) promulgates specifications for digital communication systems that use such technologies.

PLMN and cell selection is usually based on measured received signal strength (e.g., signal to interference ratio (SIR) or signal to noise ratio (SNR)) of candidate cells. When a UE performs a PLMN Scan, the UE typically carries out three steps: a received signal strength indication (RSSI) scan, cell search on chosen frequencies, and a read of broadcast PLMN information where the cell search was successful.

For 3GPP-compliant mobile communication systems, the PLMN selection process is specified in Section 4.4 of 3GPP Technical Specification (TS) 23.122 V7.5.0, Non-Access-Stratum (NAS) functions related to Mobile Station (MS) in idle mode (Release 7) (June 2006). U.S. Patent Application Publication No. US 20070121552 by B. Lindoff for "Cell Selection in High-Speed Downlink Packet Access Communication Systems" describes a cell selection process that takes into account the delay spread of the communication channel. U.S. Patent Application Publication No. US 2002/0119774 for "Method for PLMN Selection" by R. Johannesson et al. describes how a UE receives a list of data associated with networks neighboring the PLMN currently serving the UE from a base station (BS) of the PLMN currently serving the UE. A new PLMN to serve the UE can be selected based upon the list. U.S. Patent Application Publication No. US 2008/0153486 by J. Ramkull et al. for "Efficient PLMN Search Order" describes how a UE can shorten the time needed to find a cell, such as a suitable or acceptable cell, by using intelligent search orders.

Among other things, the RSSI scan involves collecting a set of samples of received signal power or energy at several frequencies in a spectral band of interest. FIG. 1 shows an example of an RSSI scan as a plot of received power versus frequency, showing signal power peaks that might be measured by a UE on each possible carrier in the 1900 megahertz (MHz) band. An RSSI scan results in measurements within the relevant channel bandwidth (e.g., 5 MHz for WCDMA and 200 kilohertz (KHz) for GSM) on roughly 300 possible carriers in the 1900 MHz band. An RSSI scan can usually be fast. For example, it might take about 300 milliseconds (ms) for a UE to scan 300 carriers in the 1900 MHz band.

European Patent Application EP 1 367 844 A1 and U.S. Patent Application Publication No. US 2003/0236079 describe a cellular phone that includes an RSSI measurement circuit for measuring power levels of received baseband signals at divided band portions of a whole frequency band, a band sorting circuit that sorts the divided band portions based on the descending order of the power levels, and a cell search circuit that searches the carriers of each divided band portion in the order of the sorting results, to thereby determine a tentative waiting cell.

A cell search can be performed without doing an RSSI scan, but cell search is a time- and energy-consuming procedure and so it is inadvisable for a UE to perform a cell search on every possible frequency. For example, each cell search may take up to 400 ms. Cell search is traditionally based on the signal strength or SNR of candidate cells. Thus, a UE typically performs an RSSI scan first, and uses power measurements generated in the RSSI scan as an indicator of where a carrier might be found and thus where a cell search should be performed.

Nevertheless, simply using RSSI values for choosing frequencies and an order of chosen frequencies for cell search is often not efficient, especially in frequency bands that are used by several RATs. In a mixed-RAT frequency band, energy detected at a frequency may originate from a different access technology and so a cell search will fail, wasting time and energy. Another problem is that in many current implementations, all WCDMA carriers are searched before any GSM carriers are searched. Thus, when there is no WCDMA coverage in a geographic area but the spectrum is still shared between different RATs, an initial cell search will take a long time when an RSSI scan indicates relatively high power levels. Additional steps must be taken to avoid unnecessary cell search.

For example, U.S. Pat. No. 7,013,140 to Östberg et al. describes two approaches that are based on a history list and cell planning knowledge. The history list is used when a PLMN scan is triggered, and then the frequencies found in the history list are objects for cell search. For WCDMA, a frequency usually covers a large geographic area and so it is likely that a carrier found before can still can be found, but the history-list approach assumes that the WCDMA carriers are found on the same frequencies as before, which is not always true. The knowledge-of-cell-planning approach is based on a rule that a network operator typically tries to fill up a frequency band completely and on the 5-MHz width of a WCDMA carrier. Carriers (cells) are then assumed to be located with 5-MHz relative distances from the first carrier placed on the lowest frequency of the band. The likelihood of finding a PLMN/cell falls as frequencies become more distant from the assumed "maximum likelihood frequencies".

For another example, U.S. Patent Application Publication No. US 2009/0137267 by A. Nader et al. for "Frequency Band Recognition Methods and Apparatus" discusses an algorithm for identifying WCDMA carriers. The algorithm starts off by comparing RSSI values for WCDMA carrier frequencies, or UARFCNs (UTRA Absolute Radio Frequency Channel Numbers), with a certain relative distance. The UARFCNs normally have a 200-KHz distance between each other with a few exceptions. If the RSSI values are found to have sufficiently small difference, the algorithm continues by comparing the UARFCNs that are one step closer to each other such that their RSSI values also do not differ too much, etc. Comparing two UARFCNs that have almost the same measured RSSI and continuing with two UARFCNs closer to each other and so on assumes that that the RSSI shape of the UARFCNs is more or less symmetrical, which is often true for more than just WCDMA. What is not symmetrical is probably not a WCDMA carrier, and hence a failed cell search can be avoided.

Nevertheless, assuming a UARFCN is more likely to host a WCDMA carrier than another frequency is not always valid. For example, in some frequency bands with additional UARFCNs, those additional UARFCN can be considered to be more likely. All UARFCNs are still possible, and if the frequency band is hosting more than WCDMA, the assumption might not be applicable. Thus, in bands with no WCDMA but still enough energy on every UARFCN, the UE would spend significant time and energy performing cell search.

RSSI methods can also be based on a fast Fourier transform (FFT) of the received radio signal. Using an FFT to find a spectral density is equivalent to passing the received signal through a bank of contiguous bandpass filters to detect the RSSI level. For example, each bandpass filter may be 15 KHz wide.

Most of the other prior approaches focus on identifying where to search, but do not contemplate trying to identify where NOT to search. Thus, in bands with no WCDMA carriers but still enough power on every UARFCN, the UE would spend significant time and energy performing WCDMA cell search.

SUMMARY

In accordance with aspects of this invention, there is provided a method in a communication system of identifying a carrier signal having a first bandwidth based on signal measurements in a second bandwidth. The method includes measuring a received energy in a second bandwidth at a plurality of different frequencies in a frequency band; filtering a set of the measured received energies in the second bandwidth with one of a matched filter, a high-pass filter, a low-pass filter, an inverting filter, and a deviation filter; and examining the filtered set to identify at least one likely frequency for the carrier signal.

In accordance with aspects of this invention, there is provided an apparatus in a receiver for a communication system for identifying a carrier signal having a first bandwidth based on signal measurements in a second bandwidth. The apparatus includes a received energy scanner configured to measure a received energy in the second bandwidth at a plurality of different frequencies in a frequency band; and a signal processor configured to filter a set of the measured received energies in the second bandwidth with one of a matched filter, a high-pass filter, a low-pass filter, an inverting filter, and a deviation filter; and to examine the filtered set to identify at least one likely frequency for the carrier signal.

In accordance with aspects of this invention, there is provided a computer-readable medium having stored instructions that, when executed by a computer, cause the computer to carry out a method in a communication system of identifying a carrier signal having a first bandwidth based on signal measurements in a second bandwidth. The method includes measuring a received energy in the second bandwidth at a plurality of different frequencies in a frequency band; filtering a set of the measured received energies in the second bandwidth with one of a matched filter, a high-pass filter, a low-pass filter, an inverting filter, and a deviation filter; and examining the filtered set to identify at least one likely frequency for the carrier signal.

BRIEF DESCRIPTION OF THE DRAWINGS

The various objects, features, and advantages of this invention will be understood by reading this description in conjunction with the drawings, in which.

DETAILED DESCRIPTION

This application focuses on WCDMA communication systems for economy of explanation, but it will be understood that the principles described in this application can be implemented in other communication systems.

A simple process of choosing frequencies, or UARFCNs, on which to look for carrier signals by performing cell search includes collecting an RSSI scan, ranking the scan values, or measured received energies, in size order, and then searching for carriers (PLMNs or cells) on frequencies in descending order of the scan value size.

Instead of simply ranking frequencies according to respective RSSI values, the inventors have recognized that search times can be decreased on average by scanning through the RSSI values with a specially configured filter and determining likely carrier frequencies based on the filtered values. Metrics from the filter can be used to indicate both where to perform cell search and where not to perform cell search. By setting a threshold and requiring a filtered RSSI to be above or below the threshold, frequencies corresponding to RSSIs that pass the threshold can be excluded from a cell search. In addition, the input RSSI values can be collected in any suitable way, including ways that do not conventionally correspond with the carriers being sought.

Figure 1:
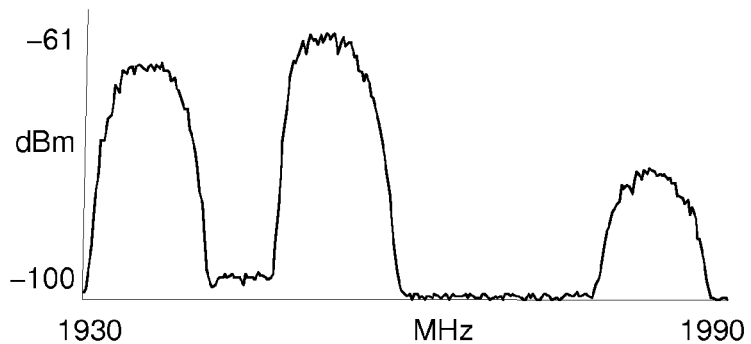
FIG. 1 is an example of a result of a received-energy scan in a 1900 MHz frequency band.
Figure 2:
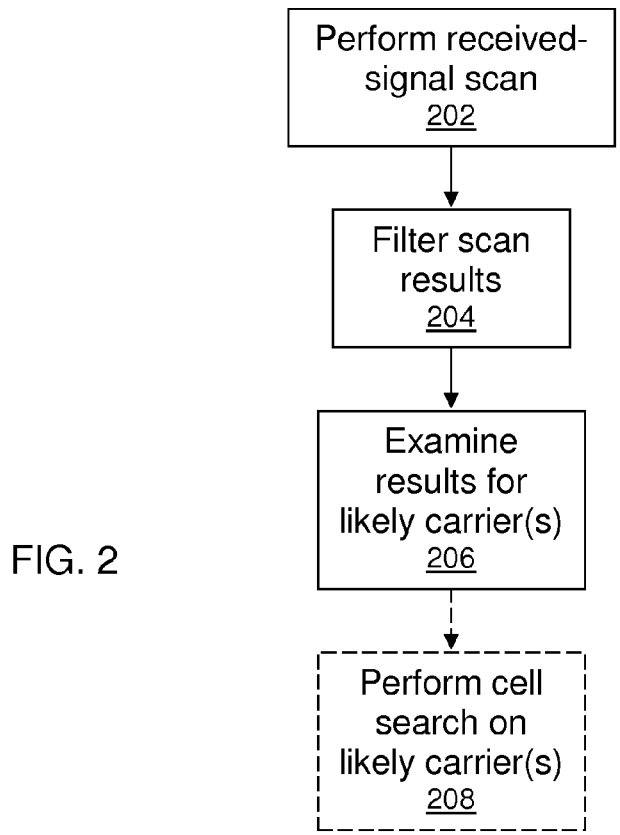
FIGS. 2, 2A, 2B, 2C are flowcharts of methods of identifying a radio carrier in accordance with this invention.

FIG. 2 is a flowchart that illustrates a method of identifying a radio carrier in accordance with this invention that can be performed by a UE in a communication system. In step 202, the UE performs a received-signal scan, such as an RSSI scan, by measuring a received energy in a bandwidth at a plurality of different frequencies in a frequency band. The bandwidth can be less than the bandwidth of the carrier being sought, greater than the bandwidth of the carrier being sought, or even substantially the same as the bandwidth of the carrier being sought. For example, if the UE is seeking a WCDMA carrier, the received-signal scan is not necessarily the conventional WCDMA RSSI scan.

In the examples described in this application, the RSSI scan values advantageously can be collected as in a GSM system, which is to say in effect, by measuring the signal power received in a 200-KHz bandwidth set at potential carrier frequencies, or ARFCNs, that are 200 KHz apart. That bandwidth is less than the 5-MHz bandwidth of a WCDMA carrier. The artisan will recognize that there are many equivalent ways to collect RSSI scan values.

In step 204, a set of the measured received energy values obtained by the received-signal scan is specially filtered by scanning the filter across the set of values. The artisan will recognize that such scanning can be expressed as the convolution of the transfer function of the filter and the function represented by the measured scan values. For easier understanding, suitable filters can be grouped in the following categories: matched filter, high-/low-pass filter, inverting filter, and deviation filter. Each filter can be a digital filter that is readily implemented by a suitably programmed or configured electronic processor or circuit, and each category is described in more detail below.

In step 206, the filtered values are examined to determine likely frequencies for carriers based on the filtered values. Metrics from the filtering step 204 can be used to indicate both where to perform search and where not to perform search. The examining step 206 can include ranking the filtered values, which correspond to potential UARFCNs, or comparing the filtered values to a threshold as described below.

As an option, the method can further include performing an otherwise conventional cell search (step 208) on one or more frequencies corresponding to one or more of the filtered values based on the examining step 206. If the filtered values have been compared to a threshold, then cell search can be performed on the frequency or frequencies whose value or values passed the threshold or was top-ranked.

For easier understanding, suitable RSSI scan value filters can be grouped in the following categories: matched filter, high-/low-pass filter, inverting filter, and deviation filter. Each category is described in more detail below. Although the bandwidth used to generate received energy values is less than the bandwidth of the carrier being sought in the following examples, it should be understood that it is currently believed that this is not necessary. The use of a filter applied to measured received signal values as a way of pattern recognition for finding a specific RAT will also be noted.

Matched Filter

In this category, a "matched" filter is one that has a passband shape that is substantially equal to the shape of the potential carriers that are sought. Thus, when the method is implemented to identify WCDMA carriers, a filter having a passband that substantially replicates the envelope of a root raised cosine function, with a width of substantially 5 MHz is used. Such an envelope is specified by 3GPP for WCDMA, and practical communication systems have carrier shapes that are specified by 3GPP or another standards-setting organization. As described above, a UE scans such a matched filter across a set of RSSI values that the UE has generated in an otherwise conventional way.

Figure 2A:
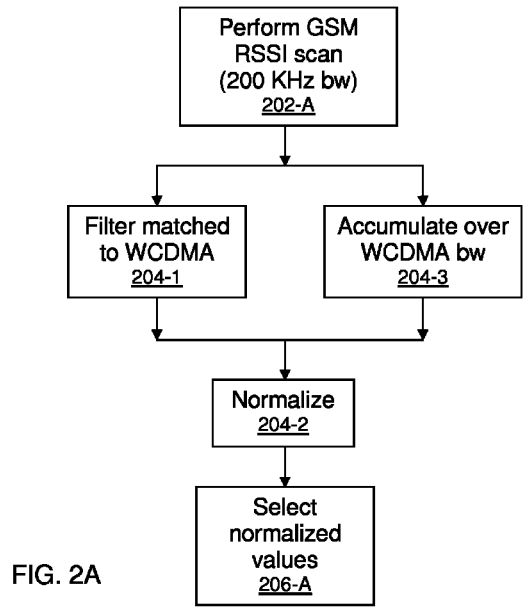

An example of a method of identifying a radio carrier with a matched filter is illustrated by FIG. 2A, which is a flowchart of the general method illustrated by FIG. 2 as adapted for a matched filter.

To identify a WCDMA carrier in this example, the UE performs an otherwise conventional GSM RSSI scan by scanning a 200-KHz wide filter across its received signal bandwidth (step 202-A). It will be noted that a GSM RSSI scan is not the conventional scan used for locating WCDMA carriers.

A set of the GSM RSSI scan values is passed through a filter (step 204-1) that has a passband matched to a WCDMA carrier, i.e., a shape matched to the envelope of a raised root cosine function with a width of about 5 MHz, for example by step-wise displacement of the filter passband through the set of RSSI scan values. The step size is preferably the spacing of the input RSSI scan values, which is 200 KHz in this example. The output value of the filter at each step is preferably normalized (step 204-2) by a corresponding estimate of the average power received in the filter bandwidth, which can be conveniently generated by averaging the RSSI scan values included in the matched filter passband at that step; or by averaging RSSI samples over the WCDMA bandwidth around that step; or from a WCDMA RSSI scan, if the latter is available; etc.

Potential WCDMA carriers are identified by selecting (step 206-A) from the filter output, i.e., normalized filtered scan values. For example, the normalized filtered scan values can be ranked, and cell search performed on corresponding frequencies in descending rank order. The filtered scan values can instead be compared to a suitable threshold, and frequencies corresponding to filtered scan values that pass the threshold (preferably at the same time that the total accumulated power exceeds a predefined level, as in current UEs) are identified as possible WCDMA carrier signals. In this example, the RSSI scan values are generated by a filter that has the GSM bandwidth (200 KHz), and such a filter is conveniently present in dual-mode GSM/WCDMA phones and other UEs capable of GSM operation and used for generating GSM RSSI scans. Thus, a dual- or multi-mode UE can use a GSM RSSI scan to locate WCDMA carriers.

High-/Low-Pass Filter

Figure 2C:
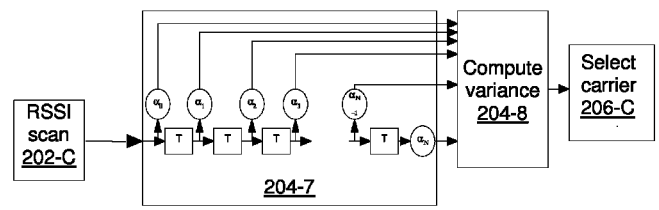
Figure 2B:
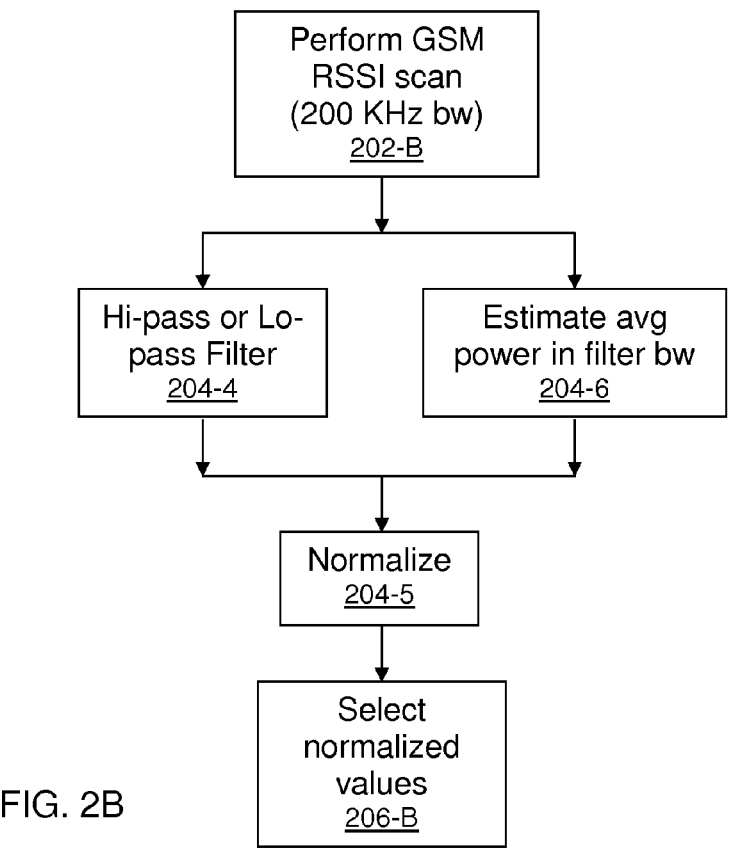

The flowchart in FIG. 2B depicts the general method illustrated by FIG. 2 as adapted for a high-pass or low-pass filter. In this category, measured received energy values, such as GSM RSSI scan values, are collected (step 202-B) and passed through either a high-pass filter or a low-pass filter (step 204-4). To identify a WCDMA carrier independent of the received signal power in this example, the filtered scan values are normalized (step 204-5) by an estimate of the average power received in the filter bandwidth (step 204-6).

Potential WCDMA carriers are identified by selecting (step 206-B) from the normalized scan values. One can view a high-pass filter and a low-pass filter as a kind of simplification of the matched filter described above. Potential carrier frequencies are identified by selecting from the normalized filtered scan values. If the set of RSSI measurement values, or more generally measured received energy values, is viewed as a sequence of samples, when the sequence is scanned through a high-pass filter, a WCDMA carrier is identified by detecting a low-level filter output signal at the position (frequency) in the sequence that corresponds to the carrier. The rationale for this behavior is that the filtered scan values will change relatively slowly, and thus tend to omit high-frequency components, when the filter encounters a WCDMA carrier as it scans slowly through the input set of RSSI values. If the set of RSSI measurement values is scanned through a low-pass filter, a WCDMA carrier is found by detecting a high-level filter output signal, which will occur when the filter scans through the RSSI measurement values that correspond to the central portion of the WCDMA carrier that tends to include low-frequency components.

Inverted Filter

Like the other categories, an "inverted" filter can be said to distinguish the spectral shape of a sought-for carrier from more narrowband signals. The shape of the filter spectrum, or equivalently, the filter transfer function, is matched to the inverse of the shape of the sought carrier. In the case of a sought WCDMA carrier, the passband shape of the inverted filter is matched to the inverse of the envelope of a root raised cosine function, with a bandwidth of approximately 3.84 MHz around the peak or slightly wider. In such a case, substantially all of the output signal samples from the inverted filter will have substantially the same value when the filter is centered on the carrier. As described above, this evaluation is performed around all potential carriers (e.g., UARFCNs).

The flowchart in FIG. 2C depicts the general method illustrated by FIG. 2 as adapted for an "inverted" filter. Measured received energy values, such as GSM RSSI scan values, are collected (step 202-C) and passed through an inverted filter (step 204-7), which can be conveniently implemented by an N-th order digital filter as shown. Suitably selecting the filter coefficients $a_0, a_1, \ldots, a_N$ selects the passband shape of the filter, and the filter coefficients can be selected in any conventional way. In addition, in the usual way, the variance of the output of the filter, Z(f), is determined (step 204-8), where the variance can be expressed as $E[Z^2(f)] - E^2[Z(f)]$ and $E[.]$ is the expected value operator. To identify a WCDMA carrier (step 206-C), the variance is compared to a suitable threshold value, which can be determined through experience. As may be expected, the threshold reflects a tradeoff between reducing the number of frequencies that should be searched and missing a carrier that is actually present. In general, the variance of the output signal samples of an inverted filter is low when the filter's center frequency is substantially the same as a sought-for carrier that is present. Larger variances indicate that the spectral shape of the received signal around the evaluated potential carrier is not a sought-for shape.

Deviation Filter

A deviation filter is similar to an inverted filter in the sense that it calculates a variance, which is typically defined as $E[(X-u)^2]$, where $E[.]$ is the expected value. For the deviation filter in this application, u is the sought reference profile, such as the envelope of a root raised cosine for a WCDMA carrier, and X is an input signal such as a set of RSSI scan values. In other words, the deviation filter computes the squared deviation from the reference profile, or variance, at each of a plurality of frequencies as the filter scans through the frequency band of interest. The computed variances are then handled in a way that is analogous to the way they are handled for the inverted filter. Thus, a deviation filter is similar to an inverted filter but includes measuring the deviation between the filter output for the actual received signal and the filter output for a stored reference signal.

Filtering measured received energy values such as a set of RSSI scan values according to one of the above-described filter categories enables a UE greatly to decrease the number of cell search attempts. Since each WCDMA cell search attempt takes approximately one second, the savings in wasted time and energy can be large. The precise number of cell searches that can be avoided depends on how the limit for including and excluding, i.e., the threshold, is chosen, which is the usual kind of tradeoff between efficiency and robustness. Simulations based on RSSI values collected in the United States, Sweden, and Finland indicated that WCDMA carriers were found as much as twenty-five times faster using filtering as described above compared to using only the raw RSSI values for ranking.

Figure 3:
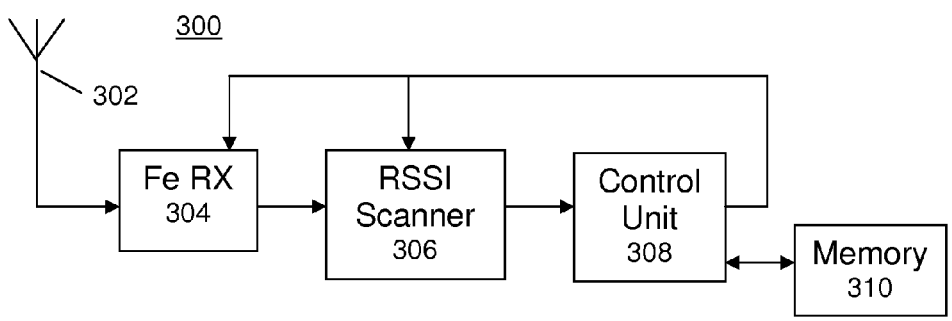
FIG. 3 is a block diagram of a portion of a user equipment in a communication system.

FIG. 3 is a block diagram of a portion of a UE 300 that is suitable for implementing the methods described above. For simplicity, only some parts of the UE 300 are shown in the figure. It will also be understood that the UE can be implemented by other arrangements and combinations of the functional blocks shown in FIG. 3.

Signals are received through an antenna 302 and down-converted to base-band signals by a front-end receiver (Fe RX) 304. On a regular basis for all detected cells, the received signal code power (RSCP) is estimated and the RSSI is computed by an RSSI scanner 306 that operates under the control of a control unit 308. An RSCP can be estimated by, for example, de-spreading the base-band signal from a detected cell with the scrambling code (and common pilot channel (CPICH) channelization code) corresponding to the cell. Methods of computing RSSIs are well known in the art. In suitable communication systems, for example, the RSSI can be estimated by computing the variance of the received signal over a given time period, such as one time slot (e.g., 0.67 ms). The control unit 308 uses the RSSI scan information in identifying radio carriers according to the methods described above. Based on the results of such searches and other factors, the control unit 308 controls the operation of the Fe RX 304. It will be appreciated that the UE 300 also typically includes a front-end transmitter (Fe TX) and other devices for sending information and using received information.

The control unit 308 and other blocks of the UE 300 can be implemented by one or more suitably programmed electronic processors, collections of logic gates, etc. that processes information stored in one or more memories 310. As explained above, the stored information may include program instructions and data that enable the control unit to implement the methods described above. It will be appreciated that the control unit typically includes timers, etc. that facilitate its operations.

Figures 4A, 4B:
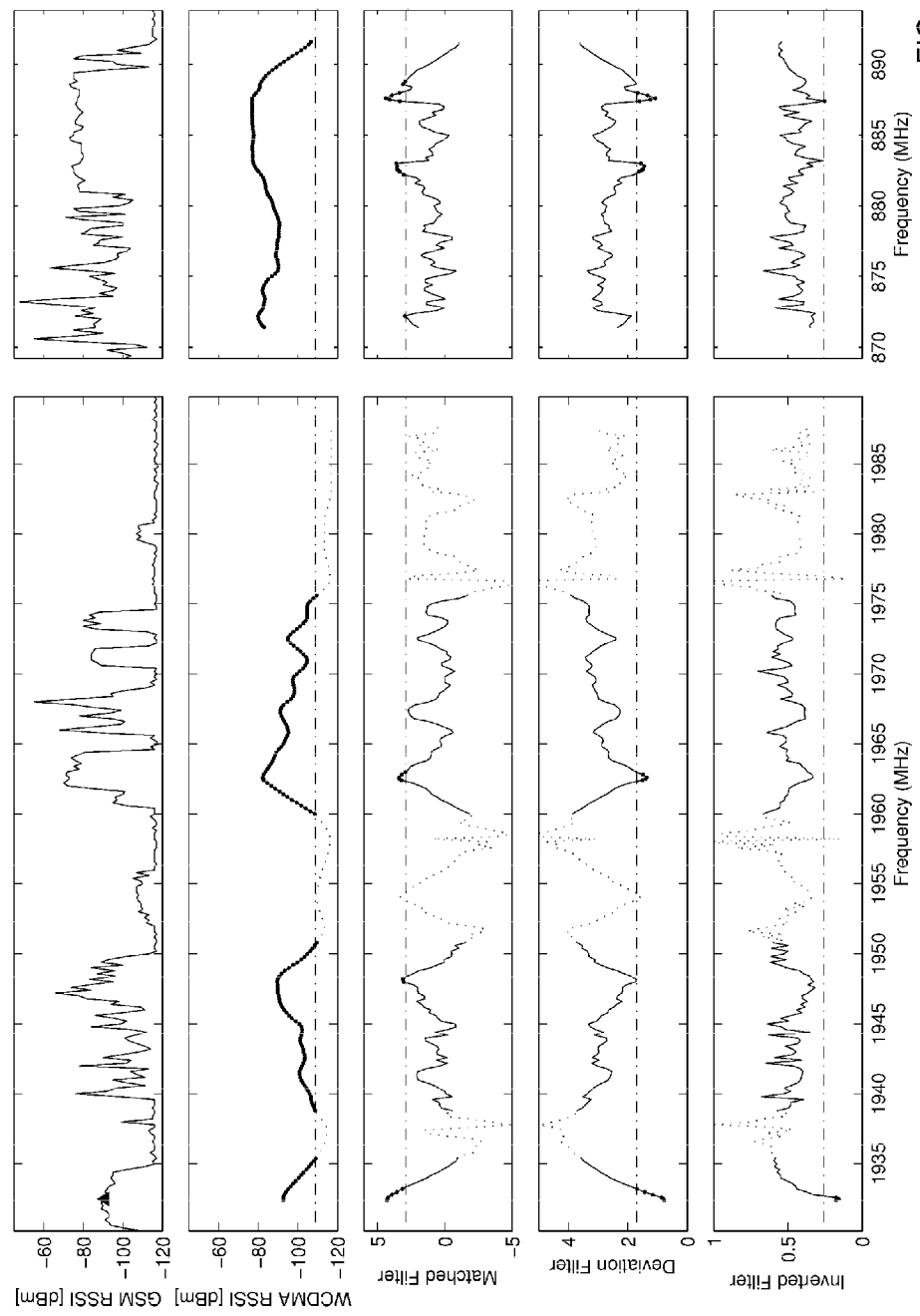
FIGS. 4A, 4B depict RSSI scans and filtered RSSI scans in two spectral bands.

FIGS. 4A, 4B are plots that enable comparing the above-described methods with the conventional methods of carrier identification based on the RSSI level. FIG. 4A shows data from actual received energy scans and filtered scans in the so-called Band II, or 1900 MHz band, from 1930 MHz to 1990 MHz, and FIG. 4B shows data from actual received energy scans and filtered scans in the so-called Band V, or 850 MHz band, from 870 MHz to 895 MHz. In all plots, the horizontal axis shows frequency, and the vertical axis shows signal level in either arbitrary or power units.

The top-most row, or row 1, of each figure shows the received energies measured by a GSM RSSI scan, i.e., with a bandwidth of 200 KHz. The vertical scale is in units of power, dBm. In FIG. 4A, the triangle in row 1 indicates where the location of a WCDMA carrier, around 1932 MHz. A WCDMA carrier was not present in the band shown in FIG. 4B.

The next-lower row, or row 2, of each figure shows the received energies measured by a WCDMA RSSI scan, i.e., with a bandwidth of 5 MHz. The vertical scale is in units of power, dBm. The measured received energies that exceed a threshold value of about −110 dBm (indicated by the horizontal dot-dash line) are indicated by heavy dots, and the measured received energies that do not exceed that threshold are indicated by dashed portions in the figures. The dots that exceed the threshold indicate the UARFCNs, which have a 200-KHz spacing, that pass the threshold, and so a conventional UE would perform cell search on each on each of those UARFCNs. It will be noted that the number of threshold-passing UARFCNs is large in both FIG. 4A, where there is one WCDMA carrier present, and in FIG. 4B, where there is no WCDMA carrier. Thus, a conventional UE would expend large amounts of time and electrical energy in performing the cell searches.

The middle row, or row 3, of each figure shows the received energies measured by the GSM RSSI as filtered by a matched filter, i.e., a filter having a spectral passband shape that is matched to the spectral shape of a WCDMA carrier. The vertical scale is in arbitrary units that reflect normalization to the average power received in a 5-MHz bandwidth, with higher values being "better". Thus, row 3 depicts a set of match-filtered received energies. The match-filtered measured received energies that pass both the WCDMA RSSI threshold of −110 dBm and a matched-filter threshold value of about 3 (indicated by the horizontal dot-dash line) are indicated by heavy dots, and an improved UE can limit its cell searches to the corresponding UARFCNs. The solid curve segments indicate match-filtered measured received energies that pass the conventional WCDMA RSSI threshold of −110 dBm but do not pass the matched-filter threshold. The match-filtered measured received energies that do not pass both thresholds are indicated by dashed portions in the figures. It will be noted from a comparison of the numbers of heavy dots in rows 2 and 3 that match-filtering measured received energies as described above can greatly decrease the number of cell searches that a UE must perform.

The next-lower row, or row 4, of each figure shows the received energies measured by the GSM RSSI as filtered by a deviation filter. The vertical scale is in arbitrary units that reflect normalization to the average power received in a 5-MHz bandwidth, with lower values being "better". Thus, row 4 depicts a set of deviation-filtered received energies. The deviation-filtered measured received energies that pass both the WCDMA RSSI threshold of −110 dBm and a deviation-filter threshold value of about 1.8 (indicated by the horizontal dot-dash line) are indicated by heavy dots, and an improved UE can limit its cell searches to the corresponding UARFCNs. The solid curve segments indicate deviation-filtered measured received energies that pass the conventional WCDMA RSSI threshold of −110 dBm but do not pass the deviation-filter threshold. The deviation-filtered measured received energies that do not pass both thresholds are indicated by dashed portions in the figures. It will be noted from a comparison of the numbers of heavy dots in rows 2 and 4 that deviation-filtering measured received energies as described above can greatly decrease the number of cell searches that a UE must perform.

The bottom row, or row 5, of each figure shows the received energies measured by the GSM RSSI as filtered by an inverted filter as described above. The vertical scale is in arbitrary units that reflect normalization to the average power received in a 5-MHz bandwidth, with lower values being "better". Thus, row 5 depicts a set of inverted-filtered received energies. The inverted-filtered measured received energies that pass both the WCDMA RSSI threshold of −110 dBm and an inverted-filter threshold value of about 0.2 (indicated by the horizontal dot-dash line) are indicated by heavy dots, and an improved UE can limit its cell searches to the corresponding UARFCNs. The solid curve segments indicate inverted-filtered measured received energies that pass the conventional WCDMA RSSI threshold of −110 dBm but do not pass the inverted-filter threshold. The inverted-filtered measured received energies that do not pass both thresholds are indicated by dashed portions in the figures. It will be noted from a comparison of the numbers of heavy dots in rows 2 and 5 that inverted-filtering measured received energies as described above can greatly decrease the number of cell searches that a UE must perform.

The figures show that the number of frequencies searched decreases dramatically with a method based on a modified and filtered RSSI scan. The numbers of red dots in the first (top) rows of the figures are greater than the numbers of red dots in the sixth (bottom) rows of the figures. Each UARFCN that is not searched yields an initial search gain of 6(200) ms=1.2 seconds (s). Therefore, when scanning several bands, the gain can be several seconds. The 1900 MHz band covers 60 MHz and includes 300 potential WCDMA carriers. If the power level is high in the complete band but there is no WCDMA coverage, a UE would take 360 s, or six minutes, to complete cell searches in that band. The filtered methods described here can decrease that to a minimum, saving more than 300 s can be gained in the initial cell search before trying something else.

It will be understood that whether values are "substantially the same" and the values of particular thresholds can be experimentally determined. By adapting the parameters based on experience, the tradeoff between cell search efficiency and robustness can be made. A UE functioning according to the present invention will (compared to a UE with traditional cell searching algorithms) consume much less time and energy.

Figure 5:
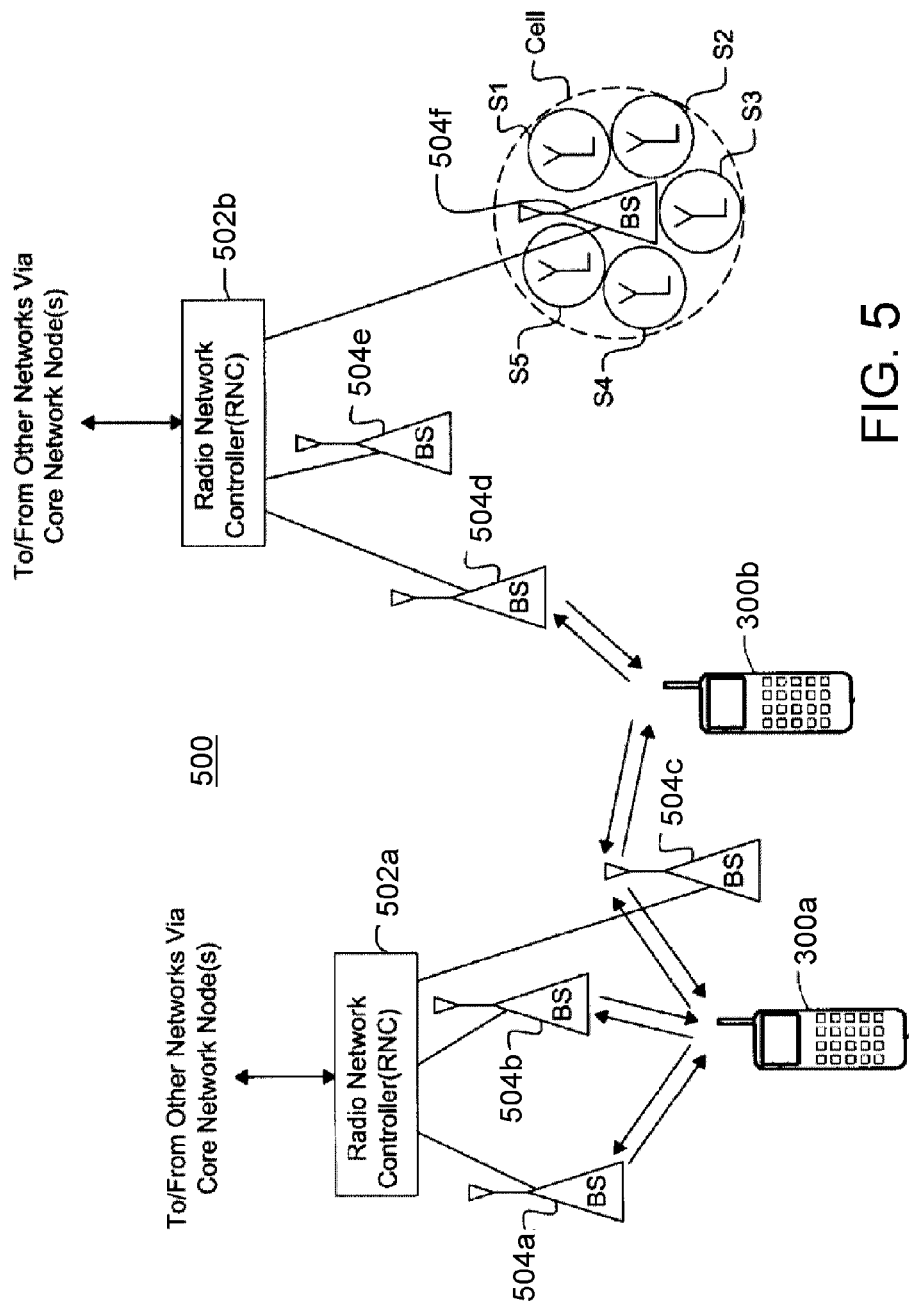
FIG. 5 is a block diagram of a communication system.

FIG. 5 is a diagram of a PLMN 500, which may be, for example, a WCDMA communication system. Radio network controllers (RNCs) 502a, 502b control various radio network functions, including for example radio access bearer setup, diversity handover, etc. More generally, each RNC directs UE calls via the appropriate RBSs, which communicate with UEs 300a, 300b through downlink (i.e., base-to-mobile, or forward) and uplink (i.e., mobile-to-base, or reverse) channels. RNC 502a is shown coupled to RBSs 504a, 504b, 504c, and RNC 502b is shown coupled to RBSs 504d, 504e, 504f. Each RBS, which is called a Node B in 3GPP parlance, serves a geographical area that can be divided into one or more cell(s). RBS 504f is shown as having five antenna sectors S1-S5, all or some of which can be said to make up the cell of the RBS 504f. The RBSs are coupled to their corresponding RNCs by dedicated telephone lines, optical fiber links, microwave links, etc. Both RNCs 502a, 502b are typically connected with external networks such as the PSTN, the Internet, etc. through one or more core network nodes, such as an MSC and/or a packet radio service node (not shown). The artisan will understand that the components and arrangement depicted in FIG. 5 are examples and should not be construed as limiting the components and arrangement of an actual communication system.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many communication devices can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method in a communication system of identifying a carrier signal having a first bandwidth of a radio access technology based on signal measurements in a second bandwidth unrelated to the radio access technology, comprising:
   measuring a received energy of the carrier signal in the second bandwidth at a plurality of different frequencies in a frequency band, using a received signal strength indication (RSSI) scan, wherein the second bandwidth is different from the first bandwidth;
   filtering received energies of the carrier signal in the second bandwidth measured at the plurality of different frequencies with one of a matched filter having a passband shape that is substantially equal to a shape of the carrier signal, a high-pass filter, a low-pass filter, an inverting filter, and a deviation filter;
   adjusting a list of said frequencies based on the filtering; and
   examining the filtered received energies in the second bandwidth on an order of the list, to identify at least one likely frequency for the carrier signal having the first bandwidth of the radio access technology.

2. The method of claim 1, wherein examining the filtered received energies comprises comparing the filtered received energies to at least one threshold.

3. The method of claim 1, further comprising performing a predetermined cell search procedure on the at least one likely frequency for the carrier signal.

4. The method of claim 1, wherein the matched filter has a bandwidth at least approximately twenty times the second bandwidth.

5. The method of claim 4, wherein the second bandwidth and a spacing between the different frequencies are 200 kilohertz.

6. The method of claim 1, wherein the measured received energies are filtered with a high-pass filter, and examining the filtered measured received energies comprises determining whether a variance of the high-pass filter's output signal passes a threshold.

7. The method of claim 1, wherein a shape of a passband of the inverted filter is substantially an inverse of a shape of the carrier signal such that substantially all output signal samples from the inverted filter have substantially the same value when the inverted filter is centered on the carrier signal.

8. The method of claim 7, wherein examining the filtered measured received energies comprises determining a variance of the output signal samples and comparing the variance to a threshold.

9. An apparatus in a receiver for a communication system for identifying a carrier signal having a first bandwidth of a radio access technology based on signal measurements in a second bandwidth unrelated to the radio access technology, comprising:
   a received energy scanner configured to measure a received energy of the carrier signal in the second bandwidth at a plurality of different frequencies in a frequency band, using a received signal strength indication (RSSI) scan, wherein the second bandwidth is different from the first bandwidth;
   a signal processor configured
      to filter received energies of the carrier signal in the second bandwidth measured at the plurality of different frequencies with one of a matched filter having a passband shape that is substantially equal to a shape of the carrier signal, a high-pass filter, a low-pass filter, an inverting filter, and a deviation filter,
      to adjusting a list of said frequencies based on the filtering, and
      to examine the filtered received energies in the second bandwidth on an order of the list, to identify at least one likely frequency for the carrier signal having the first bandwidth of the radio access technology.

10. The apparatus of claim 9, wherein the signal processor is configured to examine the filtered received energies by comparing the filtered received energies to at least one threshold.

11. The apparatus of claim 9, wherein the matched filter has a bandwidth at least approximately twenty times the second bandwidth.

12. The apparatus of claim 11, wherein the second bandwidth and a spacing between the different frequencies are 200 kilohertz.

13. The apparatus of claim 9, wherein the signal processor is configured to filter the measured received energies with a high-pass filter, and to examine the filtered measured received energies by determining whether a variance of the high-pass filter's output signal passes a threshold.

14. The apparatus of claim 9, wherein a shape of a passband of the inverted filter is substantially an inverse of a shape of the carrier signal such that substantially all output signal samples from the inverted filter have substantially the same value when the inverted filter is centered on the carrier signal.

15. The apparatus of claim 14, wherein the signal processor is configured to examine the filtered measured received energies by determining a variance of the output signal samples and comparing the variance to a threshold.

16. A non-transitory computer-readable medium having stored instructions that, when executed by a computer, cause the computer to carry out a method in a communication system of identifying a carrier signal having a first bandwidth of a radio access technology based on signal measurements in a second bandwidth unrelated to the radio access technology, wherein the method comprises:
   measuring a received energy of the carrier signal in the second bandwidth at a plurality of different frequencies in a frequency band, using a received signal strength indication (RSSI) scan, wherein the second bandwidth is different from the first bandwidth;
   filtering received energies of the carrier signal in the second bandwidth measured at the plurality of different frequencies with one of a matched filter having a passband shape that is substantially equal to a shape of the carrier signal, a high-pass filter, a low-pass filter, an inverting filter, and a deviation filter;

adjusting a list of said frequencies based on the filtering; and examining the filtered received energies in the second bandwidth on an order of the list, to identify at least one likely frequency for the carrier signal having the first bandwidth of the radio access technology.

17. The medium of claim 16, wherein examining the filtered received energies comprises comparing the filtered received energies to at least one threshold.

18. The medium of claim 16, wherein the matched filter has a bandwidth at least approximately twenty times the second bandwidth.

19. The medium of claim 16, wherein the measured received energies are filtered with a high-pass filter, and examining the filtered measured received energies comprises determining whether a variance of the high-pass filter's output signal passes a threshold.

20. The medium of claim 16, wherein a shape of a passband of the inverted filter is substantially an inverse of a shape of the carrier signal such that substantially all output signal samples from the inverted filter have substantially the same value when the inverted filter is centered on the carrier signal.

* * * * *